United States Patent [19]

Saito

[11] Patent Number: 4,490,717
[45] Date of Patent: Dec. 25, 1984

[54] GEOGRAPHIC DISPLAY DEVICE FOR A MOVING VEHICLE

[75] Inventor: Takao Saito, Aichi, Japan

[73] Assignee: Toyota Jidosha Kogyo Kabushiki Kaisha, Toyota, Japan

[21] Appl. No.: 386,761

[22] Filed: Jun. 9, 1982

[30] Foreign Application Priority Data

Jun. 15, 1981 [JP] Japan .................. 56-91967

[51] Int. Cl.³ .............. G08G 1/12; G11B 5/00
[52] U.S. Cl. .................... 340/996; 340/995; 360/12; 364/460
[58] Field of Search .......... 340/23, 24, 996, 995; 364/460, 449, 459; 360/12

[56] References Cited

U.S. PATENT DOCUMENTS

| | | | |
|---|---|---|---|
| 3,711,653 | 1/1973 | Barbier | 340/996 |
| 4,139,889 | 2/1979 | Ingels | 364/460 |
| 4,159,490 | 6/1979 | Wood | 340/996 |
| 4,190,819 | 2/1980 | Burgyan | 360/12 |
| 4,229,724 | 10/1980 | Marcus | 364/460 |
| 4,360,876 | 11/1982 | Girault | 340/24 |
| 4,402,050 | 8/1983 | Tagami | 364/460 |

Primary Examiner—James J. Groody
Attorney, Agent, or Firm—Cushman, Darby & Cushman

[57] ABSTRACT

A plurality of sections of drive route charts from a start point to a destination point of a car are sequentially switched for display on a CRT as the car travels by a predetermined distance. The drive route charts are stored in a memory as image information, together with distance information of distances from a predetermined reference point to distance correction points in the respective drive route charts. At the distance correction points of the respective drive route sections, the distance stored in the memory are updated by the actual travel distances of the car.

11 Claims, 4 Drawing Figures

GEOGRAPHIC DISPLAY DEVICE FOR A MOVING VEHICLE

BACKGROUND OF THE INVENTION (a) Field of the Invention

The present invention relates to an apparatus for graphically displaying a drive route for a vehicle such as an automobile.

(b) Description of the Prior Art

When a driver drives a car in a geographically strange area, he or she uses a map to find out a destination point. However, it is time-consuming to find out the destination point or a target from the map and it is dangerous from a standpoint of safe driving because the driver must take his or her eyes off the road. Thus, an apparatus for displaying a drive route to the destination point has been proposed. In the prior art apparatus, however, the drive route to the destination point is graphically displayed, but if a plurality of drive route charts to the destination point are required, the driver must switch over the drive route charts. This is troublesome to the driver.

SUMMARY OF THE INVENTION

It is an object of the present invention to provide an apparatus which can sequentially display each of a plurality of sectioned drive route charts.

DETAILED DESCRIPTION OF THE PREFERRED EMBODIMENT

Figure 1:
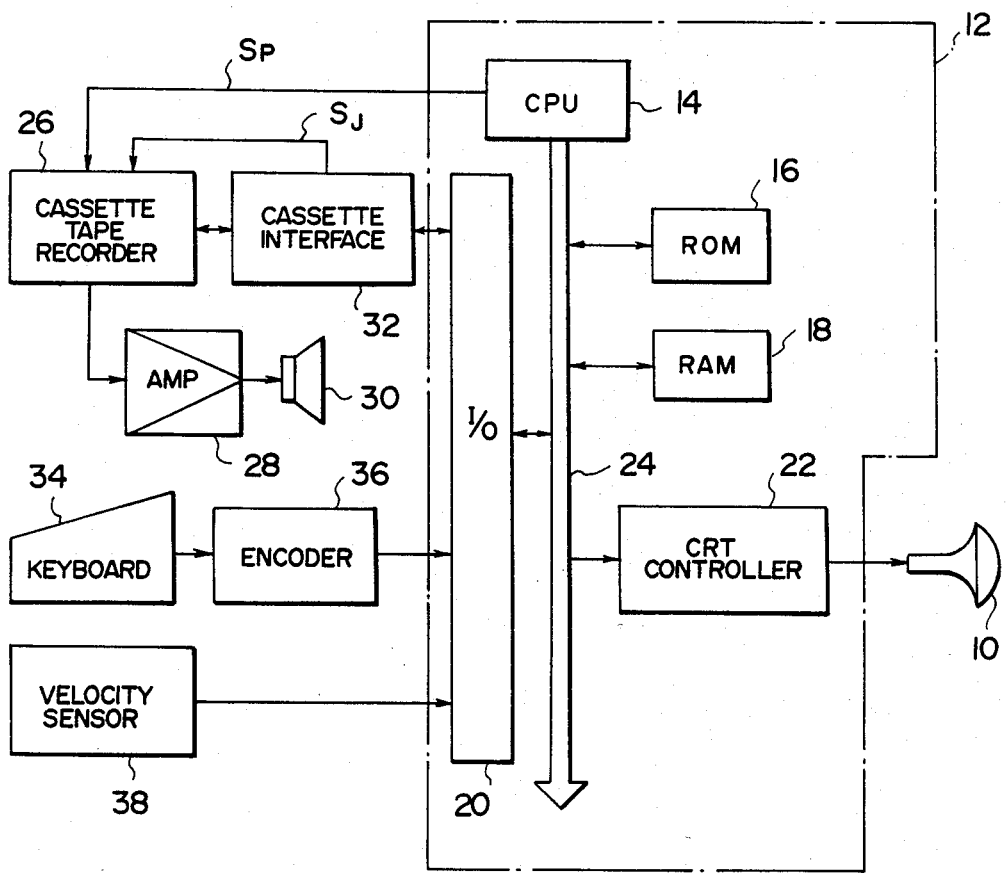
FIG. 1 shows a block diagram of an embodiment of the present invention.

FIG. 1 shows a preferred embodiment of the present invention. A cathode ray tube (CRT) 10 is provided as a display device to graphically display a drive route of a car. A control unit 12 is provided to control the CRT 10. The control unit 12 comprises a central processing unit (CPU) 14 for carrying out various arithmetic and logical operations, a non-volatile memory (ROM) 16, a volatile memory (RAM) 18, an interface 20 and a CRT controller 22. Those units are interconnected through a bus line 24.

A cassette tape recorder 26 is provided as a memory to store graphic data of the drive route. The cassette tape recorder 26 may have two to four tracks, one of which is used for voice. The content recorder on the latter track is converted to an electrical signal, amplified by an amplifier 28 and reproduced as a sound signal from a speaker 30. One of the remaining tracks is used for image information of the drive route. The image information is recorded in accordance, for example, the Kansas City standard format or the Sapporo City standard format. The information is supplied to the interface 20 through a cassette interface 32. When the information is recorded by the Kansas City standard format as an example, the cassette interface 32 modulates the output signal of the interface 20 at a transfer rate of, for example, about 300 baud and demodulates the output signal of the cassette tape recorder 26. (In this case, the interface 20 produces a serial signal.)

A keyboard 34 is provided to supply various control data to the CPU 14. The keyboard 34 has various mode keys and control keys. When one of those keys is depressed, an indicium of the depressed key is supplied to the interface 20 through an encoder 36, which converts the indicium of the key to an ASCII code, for example.

A velocity sensor 38 is provided as a travel distance detector to detect a travel distance of the car. The velocity sensor 38 includes a pulse generator which generates pulses in synchronism with the rotation of tires of the car. The pulse signals from the pulse generator are supplied to the CPU 14 through the interface 20. The CPU 14 carries out a predetermined arithmetic operation based on the pulse signals to calculate the travel distance.

The ROM 16 contains a monitor program which includes a program for processing the image information of the drive route and a program for processing information from external equipment, controlling the cassette tape recorder 26 and processing display information. The RAM 18 temporarily stores the data of the cassette tape RAM 18 comprises a memory which is reset by the power-off (turn-off of an ignition switch) to erase stored contents and a CMOS RAM which can back up contents. Both memories are reset by the ejection of the cassette tape so that all data is cleared.

The CRT controller 22 comprises a bus controller, a character generator, a signal converter and a synchronizing signal generator CRT controller 22 controls the CRT 10 under control of the program. The drive course can be displayed by three to five color patterns and the colors and the scale are determined depending on a size of the CRT 10. When the CRT 10 is a six-inch color CRT, a screen size is 112.5×83.0 mm and a resolution power is 256×192 dots, for example. The drive route is displayed within this range.

Figure 2:
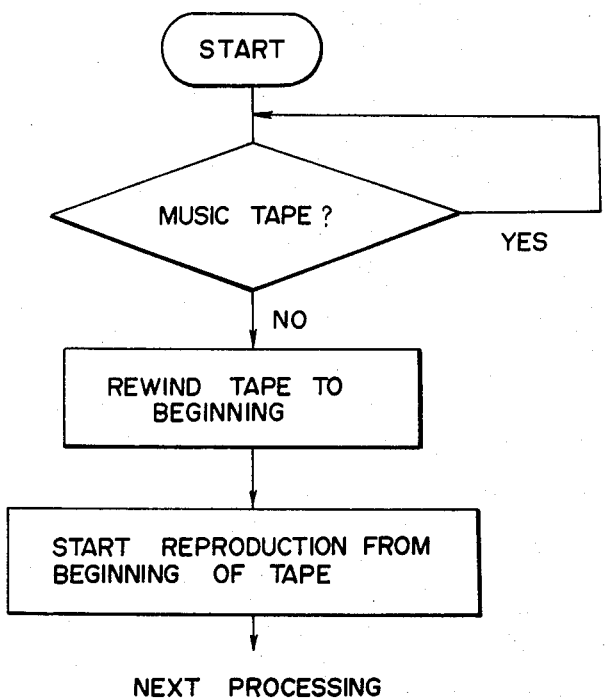
FIG. 2 shows a tape setting program in the present invention.

The drive route chart displayed on the CRT 10 can display the drive route in section such as a range of 3 km diameter. Thus, when a distance from a start point to the destination point is over 3 km, a plurality of drive route charts of the drive route from the start point to the destination point divided into sections are serially displayed. Those contents are digitized and recorded on the cassette tape. The cassette tape having the contents of the drive route charts thereon is loaded to the cassette tape recorder 26 and a play button of the cassette tape recorder 26 is depressed to start the tape. The cassette tape recorder 26 is thus put in a reproduction mode, but the driver may load a music tape by mistake. Since the tape having the digital signal recorded thereon is modulated to two high and low frequencies, the discrimination of the music tape and the digital signal tape is effected by checking if those frequencies are continuously generated in a predetermined time period. If the music tape is loaded, the operator judges whether to continue the reproduction without executing the subsequent processing or to stop the reproduction. If the tape having the contents for the drive route charts is loaded, the tape is forcibly rewound independently of the position of the tape to set the tape to a start position. Upon the completion of the setting, the reproduction is started. The cassette tape recorder 26 receives a tape discrimination signal SJ from the cassette interface 32, and a processing circuit in the cassette tape recorder 26 controls the rewind and the reproduction based on the signal SJ. The above processing is shown in a flow chart of FIG. 2.

Figure 3:
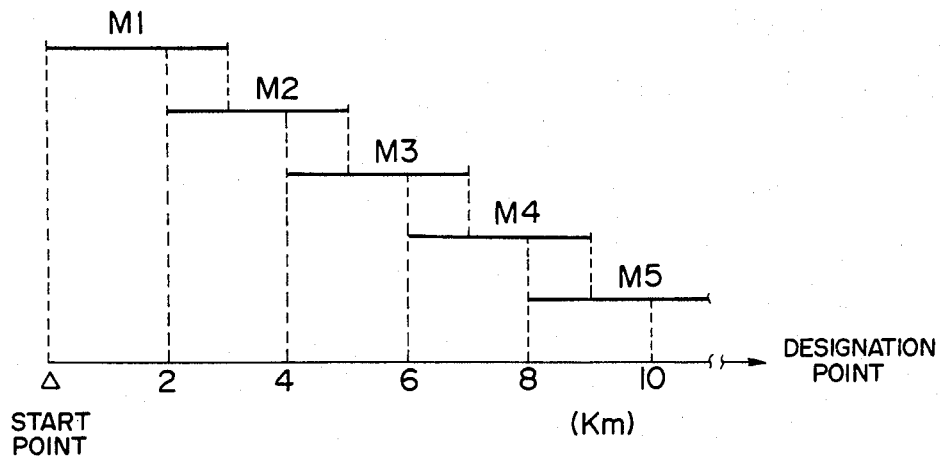
FIG. 3 shows drive route charts in the present invention.

As shown in FIG. 3, when the contents of the drive route charts of 3 km travel distance are recorded on the cassette tape, the drive route charts $M_1$, $M_2$, $M_3$ . . . are partially overlapped by a predetermined distance (e.g. 1 km) to facilitate the observation by the driver. The drive route charts are switched by the range of 2 km. The CPU 14 calculates the travel distance based on the output signal from the velocity sensor 38 and the drive route chart for the current position is displayed. Thus, the drive route chart is switched after the distance of 2 km has been travelled. In order to reduce an error of the travel distance, a characteristic point (e.g. railroad crossing or cross point) or article is specified as a travel distance correction point (hereinafter referred to as a check point) for each drive route chart. When the car reaches or passes by the check point, a voice signal is generated to instruct to the driver to depress a distance correction key "PASS" arranged on the keyboard 34. The content of the voice signal is previously recorded on the cassette tape and the cassette tape recorder 26 is driven in accordance with the travel distance so that the voice signal informing the check point is generated. The distances on the drive route charts from the start point to the respective check points are previously stored in the ROM 16 as travel distance data. Thus, when the PASS key is depressed, the CPU 14 reads in the travel distance data stored in the ROM 16 and handles the actual travel distance as the distance on the drive route chart, and executes the following processing.

For example, when the check point is set on the drive route chart at a 6.3 km point from the start point and the actual travel distance to the check point is 6.8 km, an error of 0.5 km is corrected by depressing the PASS key, and in the next distance calculation, the travel distance to the check point is set to 6.3 km.

Figure 4:
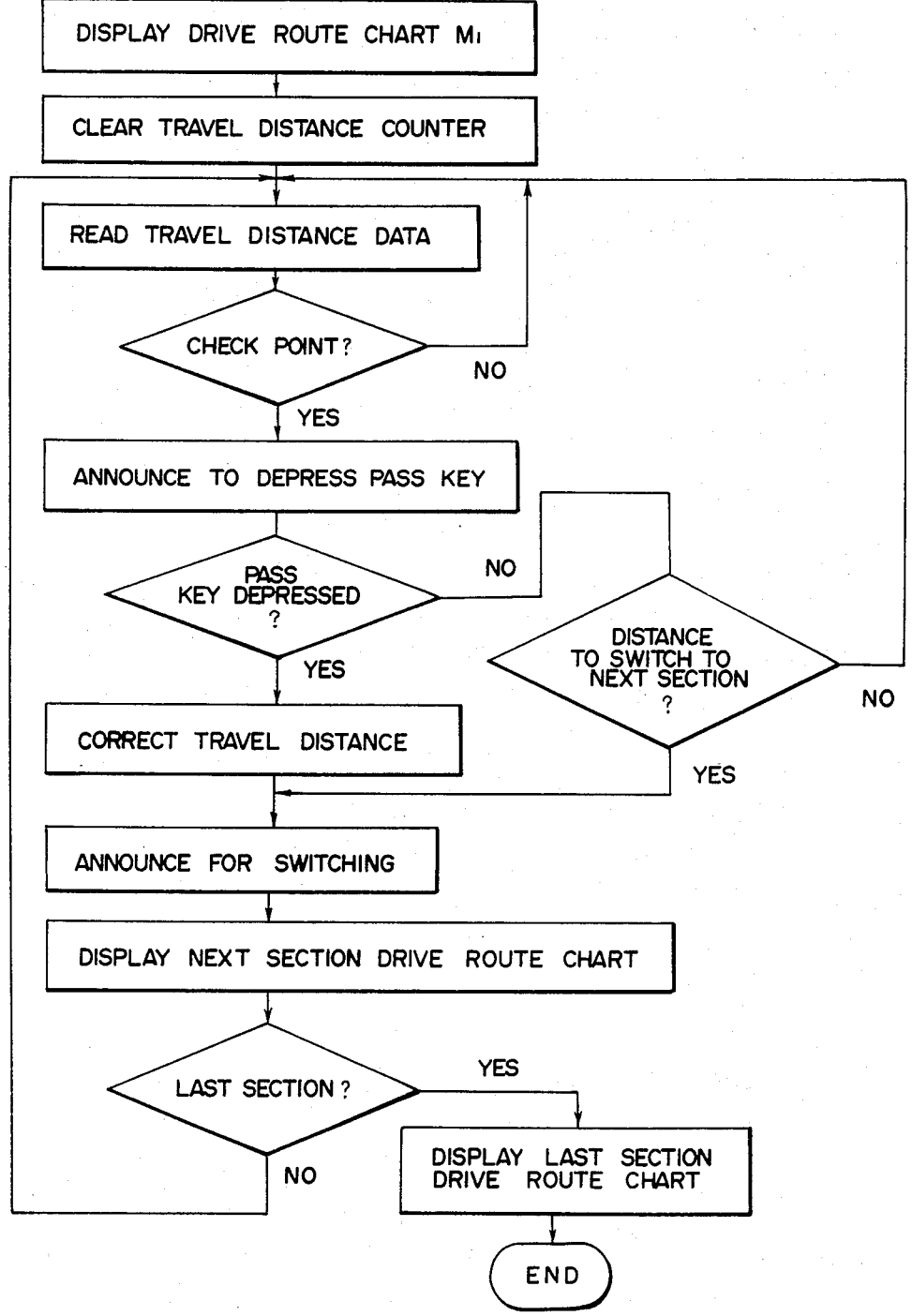
FIG. 4 shows a flow chart for switching drive route charts in the present invention.

The drive route charts are switched in accordance with a flow chart shown in FIG. 4. This processing is executed following to the execution of the processing of FIG. 2. After the drive route chart $M_1$ has been displayed, the travel distance counter is cleared and the distance information is read out from the velocity sensor 38 to calculate the distance so that it is checked at a predetermined time interval if the check point has been reached. If it is determined that the check point has been reached, the voice signal requesting the depression of the PASS key is generated. Then, it is checked if the PASS key has been depressed. When the PASS key is depressed, the travel distance of the car is registered as the distance on the drive route chart and it is used as the distance information for switching the drive route chart of the next section. When the PASS key is not depressed, the actual travel distance is used as the travel information to switch the drive route chart to the next section. Then, it is checked if the travel distance to switch the drive route chart to the next section is reached, and if the travel distance to switch has been reached, a voice signal "The drive route chart is changed to the next section." is generated. This voice signal is generated from the speaker 30 by starting the tape which has been stopped after the loading of the data of the drive route chart. The stop and the reproduction of the tape are controlled by sending the control signals from the CPU 14 to the cassette tape recorder 26. When the travel distance to switch the drive route chart to the next section has not been reached, the travel distance data is read in until the travel distance is reached. After the voice signal for informing the switching of the drive route chart has been generated, the drive route chart of the next section is displayed and the output signal of the velocity sensor 38 is again read in as the travel distance data and the same processing as described above is executed. If the drive route chart includes the designation point, the last drive route chart is continuously displayed.

If an error occurs between the programmed course change point and the actual point because the driver took a wrong way or by some error, keys "MANUAL", "BACK" and "NEXT" are sequentially depressed to manually modify the image displayed on the CRT 10. The respective keys have the following functions.

MANUAL
  Holds the drive route chart being displayed on the CRT 10.
BACK
  Displays the drive route chart immediately preceding to the currently displayed drive route chart.
NEXT
  Displays the drive route chart immediately following to the currently displayed drive route chart.

If the current point is determined by the above operation, the drive route chart which includes the nearest check point to the current point is displayed, and the PASS key is depressed when the check point is passed by, and the automatic change mode by the travel distance is resumed.

While the voice signal is used only for announcing the instructions in the above embodiment, it may be used for BGM or guide announcement. The cassette tape may be replaced by a magnetic disc or a magnetic card.

While the distance on the drive route charts to the check points are measured from the start point in the illustrated embodiment, the distances from the check points to the check points on the second and following drive route charts may be used as the distances to the check points.

As described hereinabove, according to the present invention, a plurality of sectioned drive route charts are automatically switched for display, and if the actual travel distance of the car is not equal to the distance on the drive route chart, the actual travel distance is registered on the drive route chart by depressing the PASS key. Accordingly, the drive route charts are switched for display at the predetermined points.

It should be apparent to those skilled in the art that the above-described embodiment represents but one of many possible specific embodiments of the present invention. Numerous and varied other embodiments can be devised by those skilled in the art without departing from the spirit and scope of the present invention.

What is claimed is:
1. An apparatus for automatically displaying geographical charts corresponding to the path traveled by a moving vehicle, comprising:
  memory means for storing information, said information including:
    indicia of a plurality of visual patterns, said plurality of patterns depicting the geography of at least said path,
    indicia of the position on said path of at least one check point, and
    indicia of an audible request for a correction to a calculated position on said path of said vehicle;

travel distance sensing means for sensing the distance traveled by said vehicle;

position correction switching means, manipulatable by a user, for selectively generating a position correction signal;

pattern switching means, manipulatable by a user, for selectively generating a pattern switching signal;

audio producing means, responsive to said audible request indicia and to a first control signal, for producing the audible request corresponding to said audible request indicia;

control means, responsive to said sensed distance, said position correction signal, said pattern switching signal and said stored information, for:
 calculating the position of said vehicle on said path from said sensed distance traveled;
 selecting one of said plurality of patterns corresponding to said calculated position of said vehicle on said path and automatically changing said selection as said calculated position changes;
 selecting one of said patterns different from the one corresponding to the calculated position of said vehicle in response to said pattern switching signal;
 producing said first control signal when said calculated position corresponds to the stored position of said check point; and
 correcting said calculated position according to said stored position in response to said position correcting signal; and display means, connected to said control means, for displaying said selected pattern.

2. An apparatus according to claim 1 wherein the geography depicted by at least one of said plurality of patterns stored in said memory means overlaps the geography depicted by another one of said plurality of patterns.

3. An apparatus according to claim 1 wherein at least one of said plurality of patterns depicts geography which includes said check point.

4. An apparatus according to claim 1 wherein said indicia of position stored in said memory means comprises indicia of the distance from the beginning of said path to said check point.

5. An apparatus according to claim 1 wherein said memory means comprises a magnetic disc.

6. An apparatus according to claim 1 wherein said memory means comprises a magnetic card.

7. An apparatus according to claim 1 wherein said memory means comprises a magnetic tape.

8. An apparatus according to claim 7 further including tape recorder means for supplying said information stored in said memory means to said control means.

9. An apparatus according to claim 1 wherein said control means comprises a microcomputer including a CPU, a ROM and a RAM.

10. An apparatus according to claim 1 wherein said display means comprises a CRT display.

11. A method for automatically displaying geographical charts corresponding to the path traveled by a moving vehicle, comprising:
 (1) storing information, said stored information including:
  indicia of a plurality of visual patterns, said plurality of patterns depicting the geography of at least said path,
  indicia of the position on said path of at least one check point, and
  indicia of an audible request for a correction to a calculated position on said path of said vehicle;
 (2) sensing the distance traveled by said vehicle;
 (3) calculating the position on said path of said vehicle from said sensed distance;
 (4) displaying one of said plurality of patterns corresponding to said calculated position;
 (5) automatically changing said displayed pattern as said calculated position changes;
 (6) displaying one of said patterns different from the one corresponding to said calculated position in response to a pattern switching command of a user;
 (7) producing the audible request corresponding to said audible request indicia when said calculated position corresponds to said stored position of said check point; and
 (8) correcting said calculated position according to said stored position in response to a distance correcting command of the user.

* * * * *